(12) United States Patent
Matsui

(10) Patent No.: US 6,553,291 B2
(45) Date of Patent: Apr. 22, 2003

(54) VEHICLE MANAGEMENT SYSTEM AND METHOD THEREOF

(75) Inventor: Fujio Matsui, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/034,899

(22) Filed: Dec. 26, 2001

(65) Prior Publication Data

US 2002/0087238 A1 Jul. 4, 2002

(30) Foreign Application Priority Data

Dec. 28, 2000 (JP) .......................... 2000-402677
Dec. 28, 2000 (JP) .......................... 2000-402678

(51) Int. Cl.[7] ............................................. G01M 17/00
(52) U.S. Cl. ..................... 701/33; 701/29; 701/36; 342/357.09; 370/349
(58) Field of Search ..................... 701/29, 33, 32, 701/35, 207; 342/357.09; 370/349

(56) References Cited

U.S. PATENT DOCUMENTS 5,758,300 A * 5/1998 Abe .......................... 701/35
6,285,931 B1 * 9/2001 Hattori et al. ............. 701/29
6,330,499 B1 * 12/2001 Chou et al. ................ 701/33
6,340,928 B1 * 1/2002 McCurdy .................. 340/436

FOREIGN PATENT DOCUMENTS

JP 64-052552 2/1989 .......... B60R/16/02

* cited by examiner

Primary Examiner—William A. Cuchlinski, Jr.
Assistant Examiner—Marthe Y. Marc-Coleman
(74) Attorney, Agent, or Firm—Darby & Darby (57) ABSTRACT

In a vehicle management system in accordance with the present invention, initial information of a vehicle and vehicle information of each user's vehicle that is put on the market are time-sequentially recorded in a database. A component of a vehicle or the system is diagnosed based on a time-sequential change of a learned value, and a deterioration in the performance of the component or system is grasped based on the initial information of the vehicle. Consequently, before an abnormality actually occurs in a vehicle, a user is notified of the possibility of the occurrence. This leads to improved preventive safety. Moreover, the result of diagnosis is fed back to departments concerned and reflected on quality control or development of a vehicle.

16 Claims, 6 Drawing Sheets

VEHICLE MANAGEMENT SYSTEM AND METHOD THEREOF

This application claims benefit of Japanese Application Nos. 2000-402677 filed on Dec. 28, 2000, 2000-402678 filed on Dec. 28, 2000, the contents of which are incorporated by this reference.

BACKGROUND OF THE INVENTION

1. Field of the Invention

The present invention relates to a vehicle management system for managing the conditions of users' vehicles so as to assist in avoiding occurrence of failure.

2. Description of the Related Art

In recent years, it has become a matter of common practice to include a failure diagnosis system, which can read data from an electronic controller mounted on a vehicle, for the purpose of diagnosing a failure of an automobile or any other vehicles. One of failure diagnosis systems of this type is disclosed in Japanese Examined Patent Publication No. 7-15427 filed by the present applicant. In the disclosed failure diagnosis system, data is stored within an on-vehicle electronic controller, that is, detection signals generated by sensors and switches, control signals to be transmitted to actuators including fuel injectors, and arithmetic data calculated within the system are stored within the on-vehicle electronic controller. The data stored within the on-vehicle electronic controller is read into a main apparatus of the failure diagnosis system or an external computer, which is connected to the main apparatus and has an expert system implemented therein, in order to explore defective components or causes of failure. Consequently, required repair or adjustment can be carried out.

However, the conventional failure diagnosis system is designed on the assumption that it is used at the time of regular inspection or after a vehicle has actually failed. The use frequency of the system or the site of use thereof is therefore limited. Consequently, it is hard to grasp the time-sequential changes in performance of the components of the vehicle occurring with the requirements for daily actual use by a user so as to thus manage the condition of the vehicle. There is difficulty in taking preventive measures in case of a failure.

SUMMARY OF THE INVENTION

Accordingly, an object of the present invention is to provide a vehicle management system for managing the conditions of users' vehicles so as to assist in avoiding occurrence of a failure and improving preventive safety.

Briefly, according to the present invention, there is provided a vehicle management system in which control information provided by a controller mounted on each vehicle is recorded in a database, and the condition of each vehicle is diagnosed based on the recorded control information. The result of the diagnosis is distributed to at least one of the user of the vehicle and departments to which the authority to access the database is granted. Before an abnormality actually occurs in the vehicle, the user is notified of the possibility of the occurrence. This contributes to improvement of preventive safety. Moreover, the result of diagnosis is fed back to departments concerned so that it will be reflected on quality control or vehicle development.

Other features of the present invention and the advantages thereof will be fully apparent from the description provided below.

BRIEF DESCRIPTION OF THE DRAWINGS

FIG. 1 to FIG. 6 show a first embodiment of the present invention;

FIG. 7 and FIG. 8 show a second embodiment of the present invention;

DESCRIPTION OF THE PREFERRED EMBODIMENTS

Figure 1:
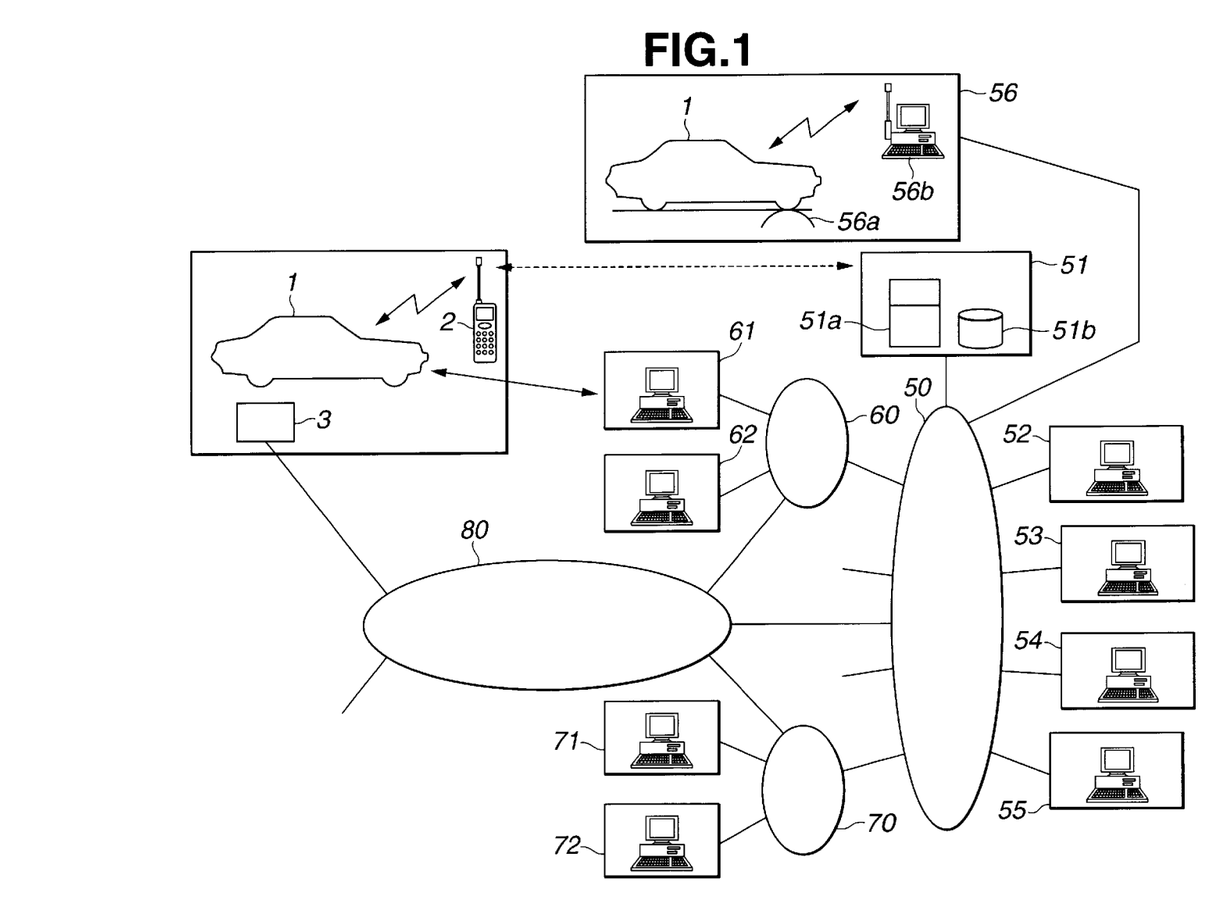
FIG. 1 shows the overall configuration of a vehicle management system.

A vehicle management system shown in FIG. 1 stores and manages initial values of control information concerning vehicles that have undergone an assembly line at a factory. Moreover, the vehicle management system manages the conditions of users' vehicles, that have been sold, around the clock, and provides users with latest own vehicle information (conditions). In the vehicle management system, a radiocommunication terminal 2 serving as a data communicating means capable of communicating data (vehicle information) provided by an on-vehicle controller to outside in real time by radio is included in each vehicle 1 that is put on the market. The vehicle information transmitted via the radiocommunication terminal 2 is recorded in a database 51b in a host computer 51a installed at a central information management center 51, and thus managed.

A mobile wireless communication system that accommodates base stations which are not shown or a satellite communication system that accommodates artificial satellites which are not shown may be utilized for data communication between each vehicle 1 and the central information management center 51. Moreover, the mobile wireless communication terminal 2 for transmitting vehicle information of each vehicle 1 may be a communication terminal connected to a controller mounted on each vehicle 1 over a harness. Preferably, the mobile wireless communication terminal 2 is a compact communication terminal that can be separated from each vehicle 1 and thus used as a portable terminal that communicates with the on-vehicle controller by wireless. In the present embodiment, a dedicated portable telephone having a communication circuit incorporated therein for the purpose of wireless communication with the on-vehicle controller is adopted as the portable communication terminal. Hereinafter, description will proceed on the assumption that the mobile wireless communication terminal 2 is a portable telephone. Incidentally, when a user already owns a portable telephone, a communication terminal that is connected to the user's portable telephone in order to transmit data may be adopted as the mobile wireless communication terminal 2.

Figure 2:
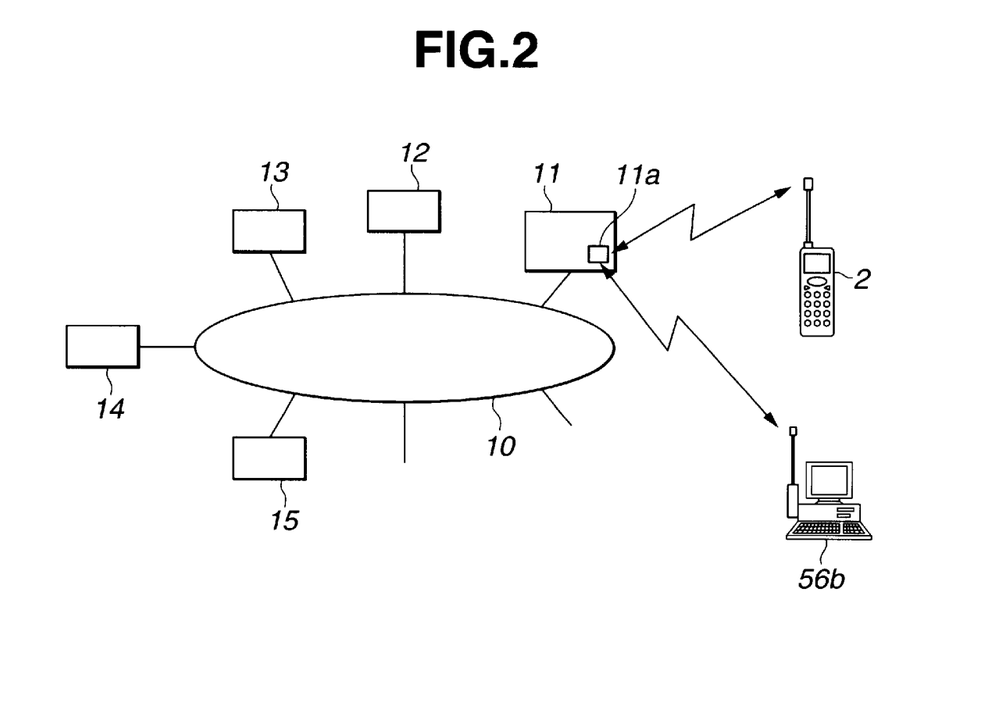
FIG. 2 is an explanatory diagram showing a network of vehicles.

In the present embodiment for transmitting data concerning each vehicle 1 to the central information management center 51 via the portable telephone 2, if only one controller is mounted on the vehicle 1, a communication circuit for controlling wireless communication is incorporated in the controller. If a plurality of controllers, for example, as shown in FIG. 2, controllers 11, 12, 13, 14, 15, etc. are mounted on each vehicle 1, the controllers 11, 12, 13, 14, 15, etc. are preferably interconnected over a network 10. Thus, control information should be unified. A communication circuit 11a for controlling wireless communication is incorporated in a predetermined controller connected over the network 10, for example, the controller 11. The network 10 is a network dedicated to the vehicle and suitable for real-time control. Moreover, a communication method based on the Bluetooth Standard that stipulates the rules for near-distance wireless communication or any other communication method can be adopted as wireless communication method to be implemented in wireless communication with the on-vehicle controller.

The communication circuit 11a incorporated in the controller on each vehicle 1 enables wireless communication with the user's dedicated portable telephone 2. Moreover, as described later, the communication circuit 11a enables wireless communication with an inspection tool that performs the inspection of a line end of the assembly line at the factory or a service tool installed at service stations of dealers or the like. Moreover, each of the controllers 11, 12, 13, 14, 15, etc. mounted on each vehicle 1 includes firmware whose various constant terms, that is, various learned values and various control constants can be rewritten in response to a command issued from the inspection tool that performs the inspection of the line end. The various constant terms are preserved even when the power supply of each controller is turned off.

By the way, the central information management center 51 is, as shown in FIG. 1, connected over a dedicated network 50 to a plurality of departments, such as, a development department 52, a software development environment department 53, a sales/service department 54, and an inspection/quality assurance department 55. Moreover, the central information management center 51 is connected to an inspection tool 56b that inspects each vehicle 1 on a chassis dynamometer 56a as a line end 56 of the assembly line at the factory. The inspection tool 56b has a communication adapter (not shown) via which the inspection tool communicates with the communication circuit 11a incorporated in the controller on each vehicle 1 by wireless.

Moreover, networks 60, 70, etc. dedicated to local dealers are connected to the dedicated network 50. Service tools 61, 71, etc. and sales tools 62, 72, etc. are interconnected over the networks 60, 70, etc, respectively. This results in the vehicle management system enabling actual diagnosis or repair of each vehicle 1 to be performed using the service tools and sales tools according to management information stored in the central information management center 51. Furthermore, the dedicated networks 50, 60, 70, etc. are interconnected over the Internet 80 that is a general public network. Consequently, information can be provided for each user via the portable telephone 2 or a user's personal computer 3.

In the aforesaid vehicle management system, the inspection tool 56b is used to perform inspection as the line end 56 of the assembly line at the factory for the purpose of storing initial values (initial information) of control information concerning vehicles. The stored initial vehicle information is analyzed in order to obtain optimal learned values or optimal constants. The optimal learned values or optimal constants are set in the controller on each vehicle. Finally, vehicles are delivered. After the vehicles are put on the market, vehicle information acquired every time a user gains access is appended to the stored initial information. In this case, as long as each user's own vehicle 1 is in operation, the user can transmit own vehicle information to the central information management center 51 by wireless communication any time irrespective of whether the vehicle is stopped or traveling.

Specifically, when a user wants to learn the state of his/her own vehicle 1, the user uses the portable telephone 2 dedicated to the vehicle 1 to transmit vehicle information to the central information management center 51. Thus, the user can acquire information concerning the condition of the vehicle, such as, the maintained state of his/her own vehicle or the presence or absence of troubles. In particular, when a vehicle is traveling, data can be transmitted in real time through mobile wireless communication. The cause of troubles that manifest only during traveling, an abnormality that can be hardly reproduced, or any other failure whose cause is conventionally hardly found out quickly can be promptly searched and coped with accordingly.

In order to transmit vehicle information of his/her own vehicle 1 to the central information management center 51, a user uses the portable telephone 2 dedicated to the vehicle 1, and enters a specific number that is pre-set for the portable telephone 2. Consequently, the controller 11 on the vehicle 1 autonomously stands by in preparation for wireless communication, and calls the central information management center 51. When a link between the portable telephone 2 and central information management center 51 is established, the communication circuit 11a incorporated in the controller 11 appends a vehicle number to data provided by the controllers interconnected over the network 10 within the vehicle 1. The resultant data is transferred to the portable telephone 2. The user's identification code or the like is also appended to the data. Finally, the resultant data is transmitted to the central information management center 51 through the portable telephone 2.

The initial information of each vehicle and the information acquired after the vehicle is put on the market (each user's vehicle information) are recorded in the database 51b in the central information management center 51. The information is distributed to the departments, to which the authority to access the database 51b is granted, over the network 50. Thus, the condition of each vehicle is managed and various kinds of services are provided for each user.

Specifically, a department concerned acquires the operating frequencies of the components of each user's vehicle, assesses a control algorithm, diagnoses the condition of each vehicle in real time, copes with troubles in real time, infers troubles by grasping a time-sequential change of each component or a change of a learned value concerning each component for the purpose of inferential diagnosis, or diagnoses troubles that can hardly be reproduced. Moreover, a department concerned improves the control algorithm or acquires information required to develop a novel product. As part of user services, a department concerned recommends each user to have his/her vehicle diagnosed before the vehicle has to be brought to a service station, or recommends each user to bring his/her vehicle to a service station for regular inspection or the like. In practice, a department concerned distributes information to dealers or the like and instructs the dealers to perform inspection or diagnosis using the service tool 61. Furthermore, a department concerned assesses the absolute level of the quality of each component among all products put on the market, acquires raw statistical data in real time, or assesses the relative level of the quality of each component relative to equivalent products manufactured by competitive manufacturers. The results of assessment are fed back to the departments.

Information including the result of data analysis or diagnosis performed on each user's vehicle is time-sequentially stored as history information concerning each user at the central information management center 51. The information is provided for each user via a home page on the Internet 80 or directly through the portable telephone 2.

Specifically, each user accesses a home page concerned by connecting his/her own personal computer 3 onto the Internet 80. Otherwise, the user uses the portable telephone 2 to directly access the central information management center 51. The user then enters his/her own identification number, name, and password, etc. that are registered in advance, and can thus read his/her own vehicle information. A user who has been registered as an authorized user may access the host computer 51a at the central information management center 51 using his/her personal computer 3. In this case, the access to be gained by the user is limited in consideration of security. The user is permitted to read only general information such as the result of diagnosis performed on his/her own vehicle.

Next, optimal constant term re-setting, inferential diagnosis, and deterioration grasping will be described in conjunction with the flowcharts of FIG. 3 to FIG. 6. The optimal constant term re-setting re-sets a learned value or control constant, which the on-vehicle controller calculates based on initial information of the vehicle, to an optimal value. The inferential diagnosis diagnoses the condition of the vehicle, which has been put on the market or sold, through inference.

Figure 3:
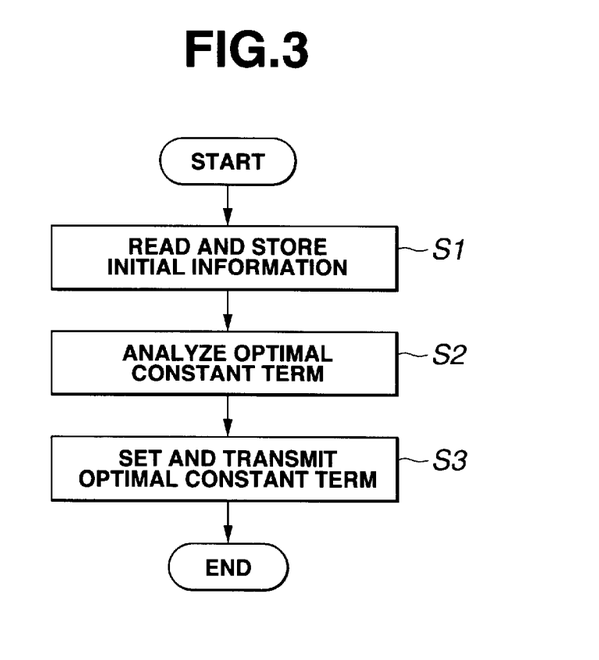
FIG. 3 is a flowchart describing constant term resetting; setting.

Referring to FIG. 3, initial information concerning the vehicle is acquired using the inspection tool 56b that performs inspection as the line end 56 of the assembly line for vehicles. Various learned values or control constants calculated by the controller are re-set to optimal values. According to the present embodiment, the host computer 51a at the central information management center 51 executes this processing when accessed by the inspection tool 56b that performs inspection as the line end 56.

Referring to FIG. 3, first, at step S1, the host computer 51a reads together with a vehicle number, various learned values data and various control data (arithmetic data) concerning the vehicle. The learned values data and control data are transmitted from the on-vehicle controller to the inspection tool 56b by wireless during line end inspection. The host computer 51a records the learned values and control data as initial vehicle information in association with a vehicle model or type in the database 51b. Control is then passed to step S2. The host computer 51a then analyzes the recorded initial vehicle information to calculate optimal constant terms containing optimal learned values and optimal constants.

To be more specific, constant terms that define control in compliance with the design specifications for a vehicle model or type are set as so-called tentative constant terms in the controller on each vehicle completed through the assembly line. The set control constants are not always optimally matched the actual properties of the components of the vehicle. Besides, a learned value obtained during test driving performed as the line end 56 may exceed an optimal range. In this case, differences in the properties of products of components actually included in vehicles from a reference property are not distributed at random within a permissible range determined based on the design specifications for the vehicle model or type. The distribution of differences in the properties of products of components belonging to the same lot usually has a certain tendency. Therefore, recorded initial information that is set in common for the same vehicle model or type is analyzed in order to grasp the property of components included in the same vehicle model or type. Thus, the learned value and control constant concerning the component is re-set to an ideal value.

Thereafter, control is passed to step S3. The host computer 51a sets optimal constant terms, transmits them to an accessing entity, and terminates this routine. During the inspection of the line end 56, the inspection tool 56b receives the optimal constant terms and a rewrite instruction that are transmitted from the host computer 51a at the central information management center 51. The received optimal constant terms and instruction are transferred to the vehicle concerned by wireless.

Consequently, the controller rewrites the constant terms contained in various control programs into optimal constant terms. Thus, immediately after a vehicle is delivered, the controllability of the vehicle can be improved. Moreover, the probability of occurrence of troubles after the vehicle is put on the market can be reduced and the preventive safety of the vehicle can be improved. In this case, acquisition of initial vehicle information during line end inspection is achieved through wireless communication. Data can therefore be acquired readily. Eventually, the initial vehicle information can be stored without decrease in productivity.

Moreover, a computer in which a system for re-setting constant terms into optimal constant terms, that is, resetting initial values is installed is not limited to a computer at the central information management center 51. That is, the system may be installed in a computer at any department involved, to which the authority to access the database 51b is granted, such as the line end 56 of the assembly line, the development department 52, the software development environment department 53, the sales/service department 54, the inspection/quality assurance department 55 or the like.

Figure 4:
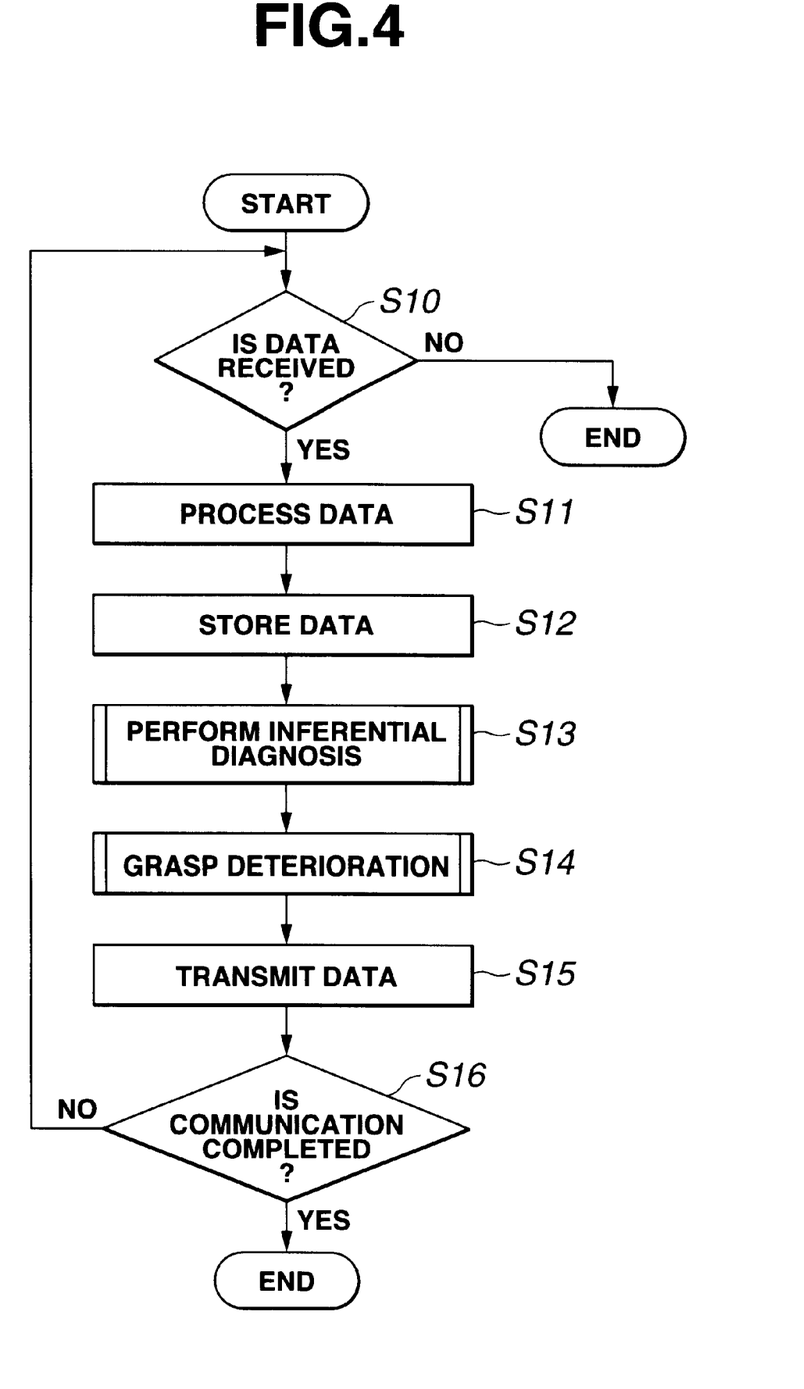
FIG. 4 is a flowchart describing vehicle information processing.

Next, processing of vehicle information concerning the vehicle that has been delivered from the factory will be described in conjunction with the flowchart of FIG. 4. FIG. 4 shows processing that is executed by the host computer 51a when the central information management center 51 is accessed by the portable telephone 2 or personal computer 3 of a registered user, or a computer at any department involved in the vehicle management system (a computer to which the authority to access the database 51b is granted). In the processing, at the first step S10, the host computer 51a checks if vehicle information is being received with access gained by the user's portable telephone 2. Moreover, the host computer 51a checks if a request for data of an own vehicle is being received with access gained by the user's personal computer 3, or a request for data is being received with access gained by a computer at any department involved in the vehicle management system. If no data is received, the routine is escaped. If data is being received, control is passed to step S11. The host computer 51a processes data. At step S12, the data is recorded in the database 51b.

For example, assume that the host computer 51a receives vehicle information while being accessed by the user's portable telephone 2. A vehicle model, control requirements (mileage and conditions for traveling), numerical data, and data type (whether data is input/output data of the on-vehicle controller, control data (arithmetic data), a learned value data, or self-diagnosis data that is provided by the on-vehicle controller) are retrieved in association with vehicle number and user identification code. These data items are then manipulated depending on devices or components such as sensors or actuators whose performance is to be inspected. The resultant data items are time-sequentially recorded in the database 51b in association with the vehicle number and user identification code. Moreover, the host computer 51a may be accessed by the user's personal computer 3 and requested to transfer data of the user's own vehicle. Otherwise, the host computer 51a may be accessed by a computer at any department involved in the vehicle management system and requested to transfer data of the user's vehicle. In this case, the host computer 51a records the requesting entity and the contents of the request as data request history in the database 51b.

Figure 5:
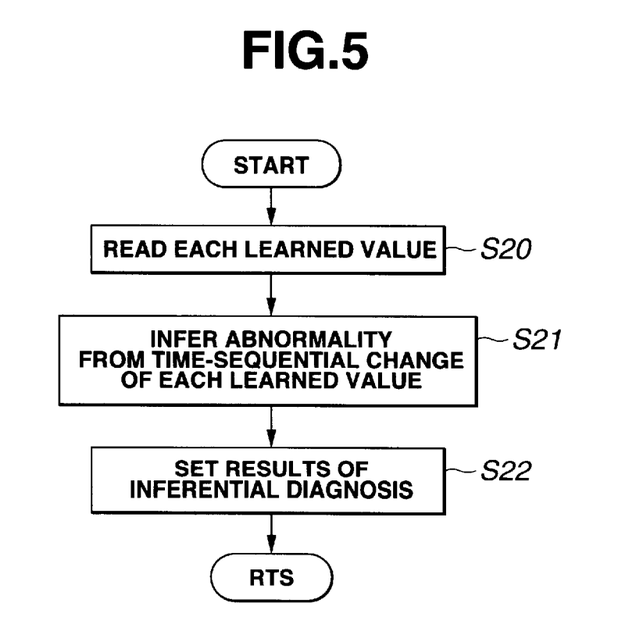
FIG. 5 is a flowchart describing inferential diagnosis.
Figure 6:
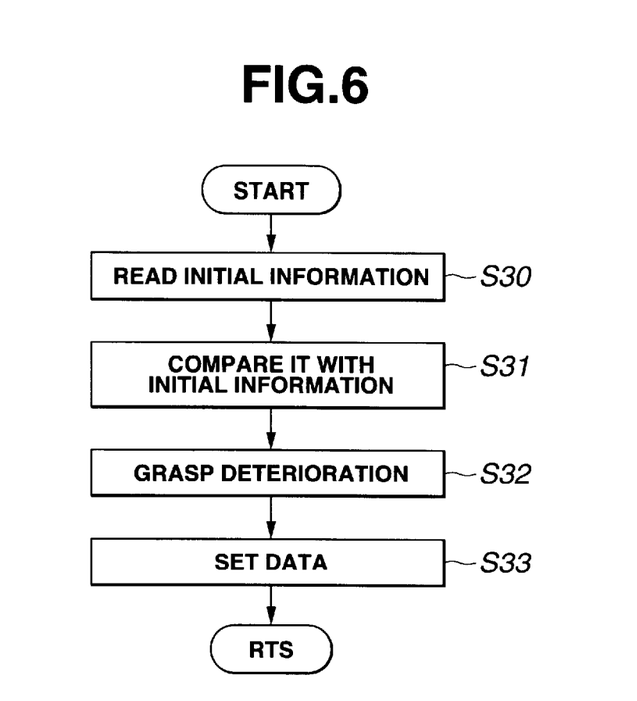
FIG. 6 is a flowchart describing deterioration grasping.

Control is then passed to step S13. Inferential diagnosis described in FIG. 5 is then executed in order to diagnose defects through inference based on the time-passing change of the learned value. At step S14, deterioration grasping described in FIG. 6 is executed in order to grasp a deterioration in the performance of the components or the system using the initial information of the vehicle. If a request for recorded vehicle information is received, the inferential diagnosis of step S13 and the deterioration grasping of step S14 are skipped.

Thereafter, control is passed to step S15. The host computer 51a transmits data. For example, when the host computer 51a is accessed by the user's portable telephone 2, the host computer 51a transmits display data, the result of self-diagnosis, and the result of deterioration grasping which are presented on the display of the portable telephone 2. Otherwise, the host computer 51a may be accessed by the user's personal computer 3 and requested to transmit data of the user's own vehicle, or by a computer at any department involved in the system and requested to transmit data of the user's vehicle. In this case, the host computer 51a transmits the requested data. At step S16, it is checked if communication is completed. If communication is not completed, control is returned to step S10. The aforesaid processing is continued. If the communication is completed, this routine is terminated.

Next, a description will be made of the inferential diagnosis of step S13 and the deterioration grasping of step S14. In the inferential diagnosis described in FIG. 5, first, at step S20, the host computer 51a reads each learned value concerning the vehicle, which is recorded time-sequentially in association with the vehicle number and user identification code, from the database 51b. At step S21, an abnormality is inferred from the time-sequential change of the learned value. At step S22, the result of inferential diagnosis is recorded as history data of the vehicle, which is identified with the vehicle number and user identification code, in the database 51b. Moreover, the result of inferential diagnosis is set so that it can be transmitted to an accessing entity. The routine is then escaped.

For example, a learned value of air-fuel ratio offered by an engine is difference of air-fuel ratio detected by air-fuel sensor for feedback control from a reference air-fuel ratio. The learned value is reflected on control of the air-fuel ratio. If the time-sequential change of the learned value of air-fuel ratio is abnormally large, or if the learned value remains unchanged, it is inferred that air-fuel control system functions improperly and that a defect may occur in the near future. Likewise, an abnormality in ignition timing control system is inferred from the time-sequential change of the learned value of ignition timing for the engine. An abnormality in idle speed control (ISC) system including an ISC valve is inferred from the time-sequential change of the learned value of idle speed.

In other words, before an abnormality occurs actually, the user is notified of the possibility of the occurrence. This leads to improved preventive safety. Moreover, if the result of inferential diagnosis is transmitted to a service station of dealers or the like, it would be utilized in procuring required parts or recommending the user to bring his/her vehicle to the service station. Furthermore, the use state of each vehicle, the use frequency thereof, and the use situation thereof can be grasped based on vehicle information sent from users. Besides, the acquired data may be secondarily manipulated or the result of inferential diagnosis may be fed back to departments concerned. Thus, the result of inferential diagnosis can be reflected on quality control or development of an unprecedented vehicle.

Moreover, inferential diagnosis based on the time-sequential change of the learned value has been described. Alternatively, the time-sequential change of input/output data or control (arithmetic) data provided by the on-vehicle controller may be recorded with predetermined requirements satisfied. An abnormality in sensors or switches concerned, in actuators concerned, or in a control system concerned may be inferred from the recorded data.

In the deterioration grasping described in FIG. 6, first, at step S30, the host computer 51a reads initial vehicle information (learned values data and various control data), which is acquired during line end inspection, in association with the vehicle number from the database 51b. At step S31, each initial learned value contained in the initial information is compared with the learned value sent from the user. At step S32, the deterioration is grasped based on the result of the comparison. Control is then passed to step S33. The result of deterioration grasping is recorded as history data of the vehicle, which is identified with the vehicle number and user identification code, in the database 51b. Moreover, other learned values each implying deterioration are set in preparation for transmission to an accessing entity. This routine is then escaped.

In other words, the larger the difference between the learned value contained in initial information and a current learned value is, the larger the degree of the progress of the deterioration occurring in the user's vehicle is. Consequently, the progress of deterioration in the performance of components such as sensors or actuators or of the system can be grasped by checking the time-sequential change of the learned value occurring by a certain time of access gained by the user on a certain date of the access since the learned value is first acquired during line end inspection. Otherwise, the progress of a deterioration in the performance of components can be grasped by checking the change of the learned value of mileage the vehicle travels from its initial state.

Consequently, a deterioration in the performance of the vehicle can be grasped while the vehicle is actually in operation. Prior to occurrence of troubles, the user is notified of the possibility of the occurrence. This leads to improved preventive safety. Moreover, if data implying deterioration is transmitted to service stations of dealers or the like, the data would be utilized in procuring required parts or recommending the user to bring his/her vehicle to the service station. Moreover, when the data implying deterioration is analyzed and fed back for the purpose of quality control, the tendency to excess sophistication in quality of product can be resolved and the costs of manufacturing can be reduced. Moreover, the data implying deterioration can be utilized in tuning the vehicle, re-setting the optimal constant terms, and developing an unprecedented vehicle.

Moreover, deterioration has been described to be grasped using the learned value. Alternatively, initial information of input/output data or control (arithmetic) data provided by the on-vehicle controller under predetermined requirements satisfied may be compared with corresponding data sent from the user, whereby deterioration may be judged.

According to the first embodiment, the condition of each user's vehicle can be managed and occurrence of abnormality can be inferred. This leads to improved preventive safety.

Next, a second embodiment of the present invention will be described below. The second embodiment is identical to the vehicle management system of the first embodiment except that when the learned value concerning each user's vehicle falls outside a normal range, abnormality is diagnosed.

Figure 7:
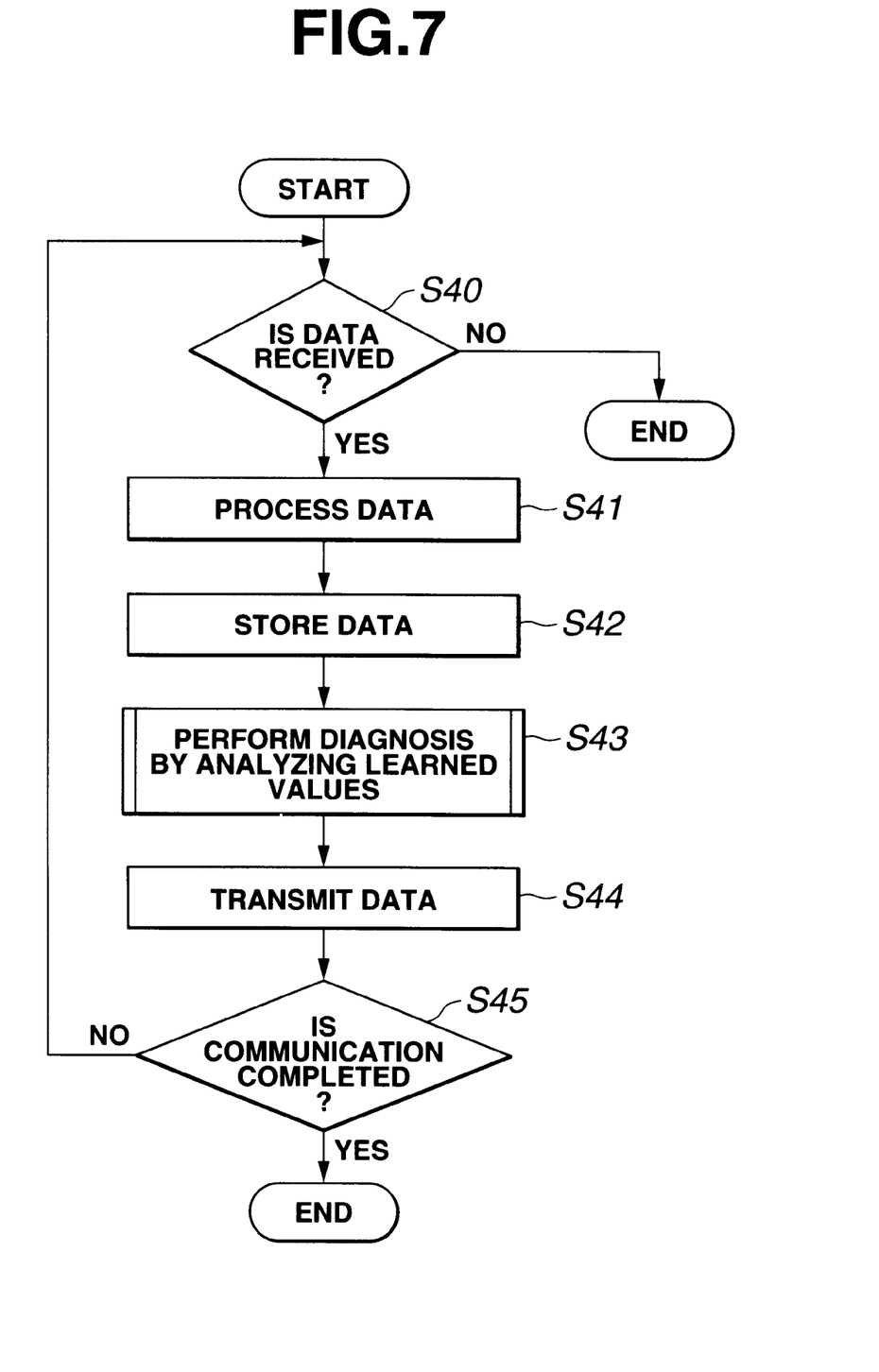
FIG. 7 is a flowchart describing vehicle information processing.

Specifically, according to the second embodiment, when the host computer 51a at the central information management center 51 is accessed by the portable telephone 2 or personal computer 3 of the registered user or by a computer at any department involved in the vehicle management system (a computer to which the authority to access the database 51b is granted), the host computer 51a executes vehicle information processing described in FIG. 7.

In the vehicle information processing, first, at step S40, the host computer 51a checks if initial vehicle information is being received with access gained by the inspection tool 56b that performs inspection as the line end 56 of the assembly line. Otherwise, the host computer 51a checks if vehicle information is being received with access gained by the portable telephone 2 of user. Otherwise, the host computer 51a checks if a request for own vehicle data is being received with access gained by the personal computer 3 of user. Otherwise, the host computer 51a checks if a request for data is being received with access gained by a computer at any department involved in the vehicle management system. If no data is received, this routine is escaped. If data is being received, control is passed to step S41. The host computer 51a processes the data. At step S42, the data is recorded in the database 51b.

For example, assume that initial vehicle information is received with access gained by the inspection tool 56b which performs the inspection of the line end 56 of the assembly line or that vehicle information is received with access gained by the portable telephone 2 of user. In this case, vehicle model, control requirements (mileage and conditions for traveling), numerical data, and data type (whether data is input/output data, control (arithmetic) data, learned value, self-diagnosis data, or the like that is provided by the on-vehicle controller) are retrieved in association with the vehicle number and user identification code (needless to say, if a vehicle concerned has not been sold, no user identification code is assigned). These data items are then manipulated depending on devices or components such as sensors or actuators whose performance is to be inspected. The resultant data items are time-sequentially recorded in the database 51b in association with the vehicle number and user identification code. Moreover, assume that a request for data of the user's own vehicle is received with access gained by the user's personal computer 3, or that a request for data of the user's vehicle is received with access gained by a computer at any department involved in the vehicle management system. In this case, the requesting entity and the contents of the request are recorded as data request history in the database 51b.

Figure 8:
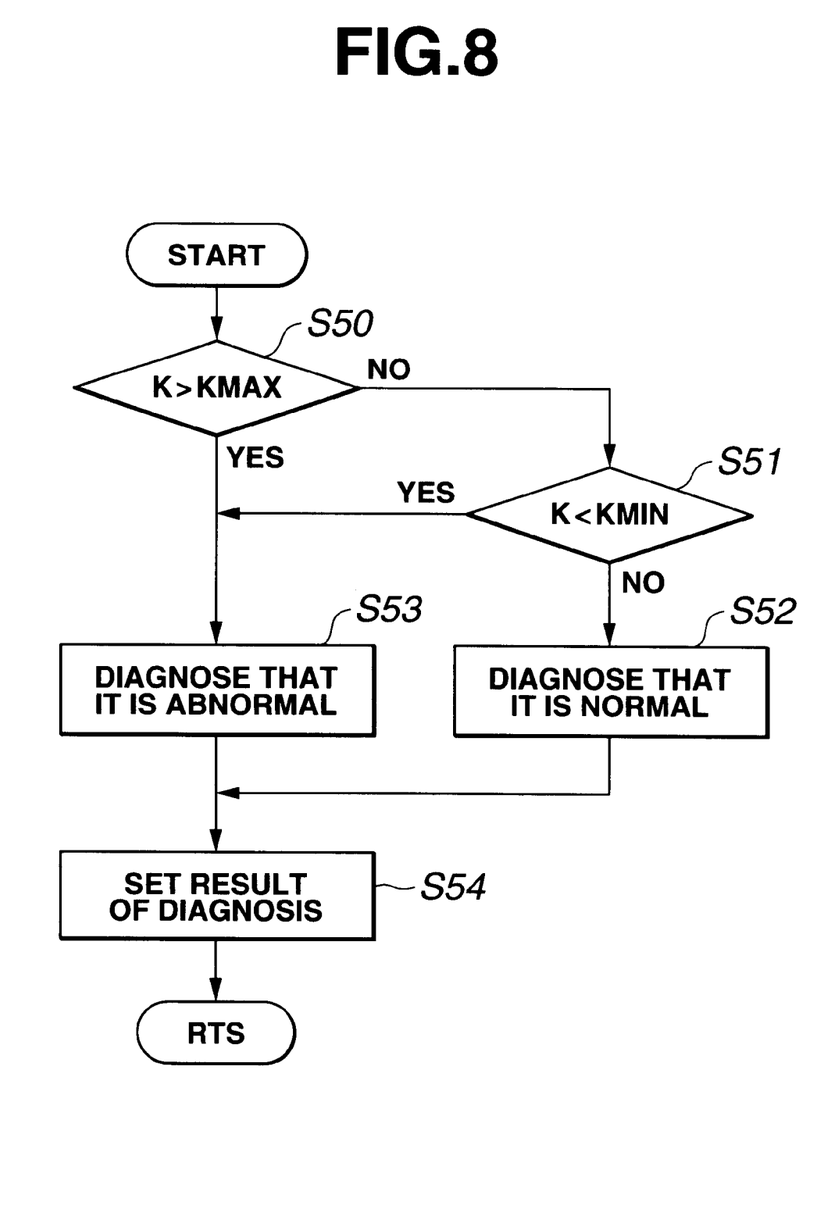
FIG. 8 is a flowchart describing diagnosis based on a learned value.

Control is then passed to step S43. Diagnosis based on the learned value described in FIG. 8 is executed. When a request for recorded vehicle information is received, the diagnosis based on the learned value is skipped. Thereafter, control is passed to step S44. The host computer 51a transmits requested data. For example, when the host computer 51a is accessed by the user's portable telephone 2, the host computer 51a transmits display data and the result of diagnosis based on the learned value which are presented on the display of the portable telephone 2. Otherwise, assume that request for data of the user's own vehicle is received with access gained by the user's personal computer 3, or that request for data of the user's vehicle is received with access gained by a computer at any department involved in the vehicle management system. In this case, the host computer 51a transmits the requested data. The host computer 51a checks at step S45 if communication is completed. If communication is not completed, control is returned to step S40. The foregoing processing is continued. If the communication is completed, the routine is terminated.

Next, diagnosis based on the learned value which is executed at step S43 will be described below. In the diagnosis based on the learned value described in FIG. 8, the host computer 51a first reads each learned value data K concerning a vehicle, which is recorded in association with the vehicle number and user identification code, from the database 51b. The host computer 51a then checks if each learned value K falls within a normal range from upper limit KMAX to lower limit KMIN. The upper and lower limits are predefined in order to judge an abnormality from the learned value.

The upper limit KMAX and lower limit KMIN define a range of learned values indicating that control system functions properly. The proper range of learned values is determined based on a value obtained through simulation or experimentally or the like in consideration of the properties of the control system concerned and its peripheral sensors or actuators which are employed in the vehicle model or type, and the value obtained by analyzing information acquired actually in the vehicle and recorded in the database 51b.

To be more specific, at step S50, each learned value K is compared with the upper limit KMAX. If $K \leq KMAX$, the learned value K is compared with the lower limit KMIN at step S51. If it is found at step S50 and step S51 that $KMIN \leq K \leq KMAX$ and that the learned value K falls within the normal range, control is passed to step S52. The control system relevant to the learned value K is diagnosed to be normal.

In contrast, if it is found at step S50 that $K > KMAX$ or it is found at step S51 that $K < KMIN$ and that the learned value K falls outside the normal range, control is passed to step S53. The control system relevant to the learned value K is diagnosed to be abnormal. At step S54, the result of the diagnosis based on the learned value is recorded as history data of the vehicle in association with the vehicle number and user identification code in the database 51b. Moreover, the result of the diagnosis is set for preparation of transmission to an accessing entity. The routine is then escaped.

For example, the learned value of air-fuel ratio offered by an engine is difference of air-fuel ratio, which is detected by air-fuel sensor for the purpose of feedback control, from the reference air-fuel ratio. The learned value is reflected on control of the air-fuel ratio. If the learned value of the air-fuel ratio falls outside a normal range, air-fuel control system controls the air-fuel ratio abnormally. A defect may occur in the near future. Likewise, if the learned value of ignition timing falls outside a normal range, ignition timing control system is diagnosed to be abnormal. If the learned value of idle speed falls outside a normal range, occurrence of abnormality in idle speed control (ISC) system including the ISC valve is inferred. Furthermore, assume that a vehicle installs electronically controlled throttle device and control system learns the fully closed position of the throttle value with the throttle opening angle. In this case, if the learned value of the throttle opening angle causing the throttle valve to close fully falls outside a normal range, a throttle angle sensor or the electronic throttle control system is diagnosed to be abnormal.

Before failure occurs actually, user is notified of the possibility of the occurrence. Thus, the occurrence of failure can be avoided and preventive safety can be improved. Moreover, if the result of diagnosis is transmitted to the service stations of dealers or the like, the result of diagnosis would be utilized in procuring required parts or recommending the user to bring his/her vehicle to the service station. Furthermore, the use state of each vehicle, the use frequency thereof, or the use situation thereof can be grasped based on vehicle information sent from the user. When obtained data is secondarily manipulated or the result of diagnosis is fed back to departments concerned, the result of diagnosis can be reflected on quality control or development of the unprecedented vehicles.

A computer in which the aforesaid diagnosis based on the learned value is implemented is not limited to the computer at the central information management center 51. Alternatively, the diagnosis based on the learned value may be implemented in a computer used to perform the inspection of the line end 56 of the assembly line or a computer at any department concerned to which the authority to access the database 51b is granted. Herein, the department may be the development department 52, software development environment department 53, sales/service department 54, inspection/quality assurance department 55 or the like.

As described so far, according to the second embodiment, the condition of each user's vehicle can be managed, occurrence of failure can be avoided, and preventive safety can be improved.

In the present invention, it is apparent that a wide range of different embodiments can be constructed based on the invention without a departure from the spirit or scope of the invention. The present invention will be limited to the appended claims but not restricted to any specific embodiment.

What is claimed is:

1. A vehicle management system for controlling a physical condition of a vehicle having a plurality of controllers for controlling various operating conditions of said vehicle and for storing data of said operating conditions and a central information management center connected to various support departments that communicate with each other, comprising:

a database system included in said central information management center for individually storing said data;

a radio communication system mounted on said vehicle for exclusively transmitting said data from said vehicle to said central information management center by wireless communication means in real time; and a network system connected to said central information management center and said support departments respectively for predicting an abnormality in said data after checking whether or not there is an existence of said abnormality in a change of said data and for transmitting said abnormality information from said vehicle to at least one of said support departments with an accessibility thereto so as to effectively control a physical condition of said vehicle and to improve driving safety of said vehicle in any operating condition.

2. The vehicle management system according to claim 1, wherein said data is at least one of learned values, input/output data, and arithmetic data provided by said controller.

3. The vehicle management system according to claim 1, wherein a communication circuit for performing wireless communication is incorporated in both said wireless communication means and one of said controllers.

4. The vehicle management system according to claim 3, wherein said wireless communication means is a portable telephone that communicates wirelessly with said one of said controllers.

5. A vehicle management system for controlling a physical condition of a vehicle having a plurality of controllers for controlling various operating conditions of said vehicle and for storing data of said operating conditions and a central information management center connected to various support departments that communicate with each other, comprising:

a database system included in said central information management center for individually storing an initial value of said data;

a radio communication system mounted on said vehicle for exclusively transmitting said data from said vehicle to said central. information management center by wireless communication means in real time; and a network system connected to said central information management center and said support departments respectively for grasping a deterioration of components mounted on said vehicle from said data after comparing respective data with said initial value and for transmitting said deterioration information from said vehicle to at least one of said support departments with an accessibility thereto so as to effectively control a physical condition of said vehicle and to improve driving safety of said vehicle in any operating condition.

6. The vehicle management system according to claim 5, wherein said data is at least one of learned values, input/output data, and arithmetic data provided by at least one of said controllers.

7. The vehicle management system according to claim 5, wherein a communication circuit for performing wireless communication is incorporated in both said wireless communication means and one of said controllers.

8. The vehicle management system according to claim 7, wherein said wireless communication means is a portable telephone that communicates wirelessly with said one of said controllers.

9. A vehicle management system for controlling a physical condition of a vehicle having a plurality of controllers for controlling various operating conditions of said vehicle and for storing data of said operating conditions and a central information management center connected to various support departments that communicate with each other, comprising:

a database system included in said central information management center for individually storing an initial value of said data;

a radio communication system mounted on said vehicle for exclusively transmitting said data from said vehicle to said central information management center by wireless communication means in real time; and a network system connected to said central information management center and said support departments respectively for re-setting an optimum value of control constants of respective control equations in said controller from said data after analyzing said initial value and for transmitting said optimum value information from said vehicle to at least one of said support departments with an accessibility thereto so as to effectively control a physical condition of said vehicle and to improve driving safety of said vehicle in any operating condition.

10. The vehicle management system according to claim 9, wherein said data is at least one of learned values, input/output data, and arithmetic data provided by at least one of said controllers.

11. A vehicle management system for controlling a physical condition of a vehicle having a plurality of controllers for controlling various operating conditions of said vehicle and for storing data of said operating conditions and a central information management center connected to various support departments that communicate with each other, comprising:

a database system included in said central information management center for individually storing said data;

a radio communication system mounted on said vehicle for exclusively transmitting said data from said vehicle to said central information management center by wireless communication means in real time; and a network system connected to said central information management center and said support departments respectively for recording an abnormality information after checking whether or not said data is outside of a predetermined range and for transmitting said abnormality information from said vehicle to at least one of said support departments having an accessibility thereto so as to effectively control a physical condition of said vehicle and to improve driving safety of said vehicle in any operating condition.

12. The vehicle management system according to claim 11, wherein said data is at least one of a learned value of air-fuel ratio offered by an engine, a learned value of ignition tuning, a learned value of idle speed, and a learned value of a throttle opening angle causing a throttle valve to close fully.

13. A vehicle management method for controlling a physical condition of a vehicle having a plurality of controllers for controlling various operating conditions of said vehicle and for storing data of said operating conditions and a central information management center connected to various support departments that communicate with each other, comprising the steps of:

storing said data individually in a database system of said central information management center by wireless communication means in real time;

checking whether or not there is an existence of an abnormality in a change of said data;

predicting said abnormality in said data;

transmitting abnormality information from said vehicle to at least one of said support departments with an accessibility thereto; and improving driving safety of said vehicle in any operating condition via a network system connected to said central information management center and said support departments respectively so as to effectively control a physical condition of said vehicle.

14. A vehicle management method for controlling a physical condition of a vehicle having a plurality of controllers for controlling various operating conditions of said vehicle and for storing data of said operating conditions and a central information management center connected to various support departments that communicate with each other, comprising the steps of:

storing an initial value of said data in a database system of said central information management center individually by wireless communication means in real time;

comparing respective data with said initial value;

grasping a deterioration of components of said vehicle from said data;

transmitting deterioration information from said vehicle to at least one of said support departments with an accessibility thereto; and improving driving safety of said vehicle in any operating condition via a network system connected to said central information management center and said support departments respectively so as to effectively control a physical condition of said vehicle.

15. A vehicle management method for controlling a physical condition of a vehicle having a plurality of controllers for controlling various operating conditions of said vehicle and for storing data of said operating conditions and a central information management center connected to various support departments that communicate with each other, comprising the steps of:

storing an initial value of said data in a database system of said central information management center individually by wireless communication means in real time;

re-setting an optimum value of control constants of respective control equations in said controller from said data after analyzing said initial value;

transmitting optimum value information from said vehicle to at least one of said support departments with an accessibility thereto; and improving driving safety of said vehicle in any operating condition via a network system connected to said central information management center and said support departments respectively so as to effectively control a physical condition of said vehicle.

16. A vehicle management method for controlling a physical condition of a vehicle having a plurality of controllers for controlling various operating conditions of said vehicle and for storing data of said operating conditions and a central information management center connected to various support departments that communicate with each other, comprising the steps of:

storing said data in a database system of said central information management center individually by wireless communication means in real time;

checking whether or not said data is out of a predetermined range;

recording abnormality information of said data;

transmitting the abnormality information from said vehicle to at least one of said support departments with an accessibility thereto; and improving driving safety of said vehicle in any operating condition via a network system connected to said central information management center and said support departments respectively so as to effectively control a physical condition of said vehicle.

* * * * *